March 15, 1949. L. DEVOL 2,464,216
VIBRATORY CONVEYER
Filed July 13, 1945
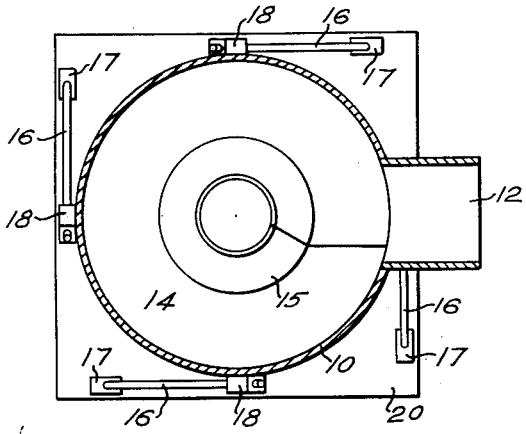
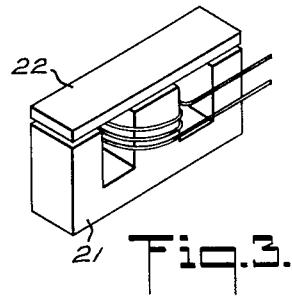
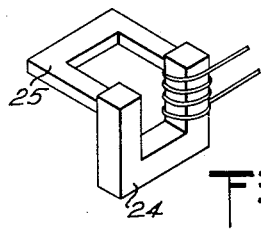
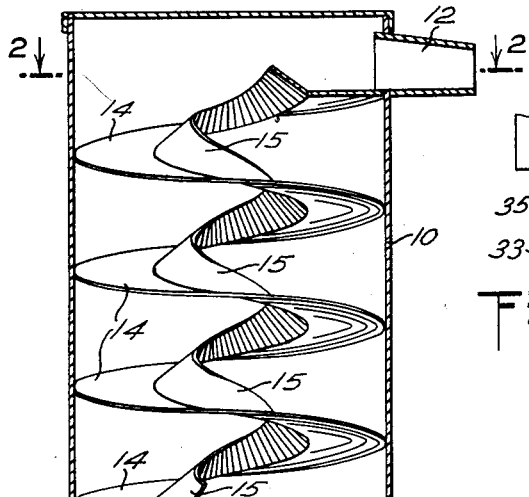
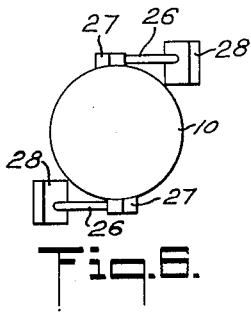
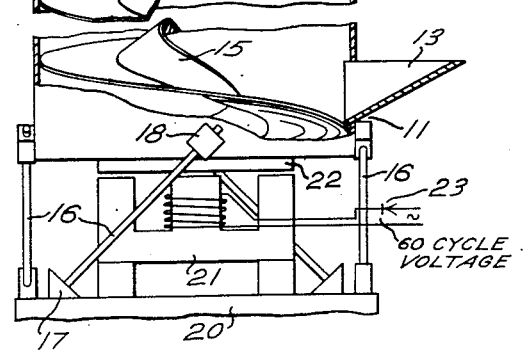
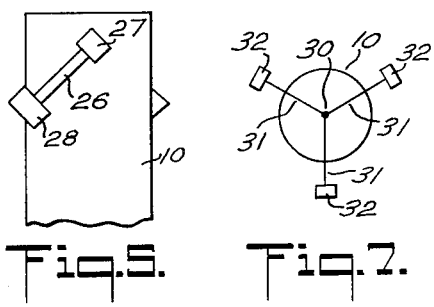
INVENTOR
LEE DEVOL

UNITED STATES PATENT OFFICE 2,464,216

VIBRATORY CONVEYER

Lee Devol, Drexel Hill, Pa., assignor, by mesne assignments, to Anthracite Equipment Corporation, Wilkes-Barre, Pa., a corporation of Delaware Application July 13, 1945, Serial No. 604,768

6 Claims. (Cl. 198—220)

The present invention relates to conveyors and more particularly to a vibratory type of conveyor.

In equipment heretofore available, it has been the practice to vibrate a surface on which the material rests at relatively high frequency and low amplitude. The surface to be vibrated is in the form of a chute arranged horizontally, or in some instances at an angle not exceeding fifteen degrees, while for steeper slopes this type of conveyor has been found impractical. The industry recognizes this handicap and has been seeking and demanding a conveyor capable of conveying material vertically by vibration.

Some of the objects of the present invention are: to provide an improved vibratory conveyor for material; to provide means for conveying material vertically by vibration; to provide a conveyor actuated by a combined linear vibration and angular vibration, to cause material to move in a circular or helical path; to provide a vertically disposed conveyor comprising a tube and ramp subject to continuous vibration, wherein all portions of the tube regardless of its length are substantially in phase; and to provide other improvements as will hereinafter appear.

In the accompanying drawings, Fig. 1 represents a sectional elevation of a conveyor embodying one form of the present invention; Fig. 2 represents a section on line 2—2 of Fig. 1; Fig. 3 represents a perspective detail of one form of energizing magnet and its armature; Fig. 4 represents a perspective of a modified form of magnet; Fig. 5 represents a fragmentary elevation of a conveyor tube showing a form of supplemental springs for maintaining vibrations in phase throughout the length of the tube; Fig. 6 represents a plan of the parts shown in Fig. 5; Fig. 7 represents a plan of a modified form of the invention; and Fig. 8 represents a detail showing another modification.

Referring to the drawings, one form of the present invention comprises a vertically mounted cylindrical tube 10 having an inlet 11 adjacent the bottom thereof and a discharge outlet 12 laterally disposed adjacent the top thereof. A hopper 13 having an inclined bottom serves to deliver material to the inlet 11 in order to be elevated and discharged through the outlet 12. Between the inlet 11 and the outlet 12 there is a helical ramp 14 for transferring the material vertically upward from the inlet 11 to the outlet 12 by means as will be presently described. The outer edges of the ramp 14 are welded or otherwise made fast to the inner wall of the tube 10, while the inner edges thereof are formed with a continuous, relatively narrow wall or fence 15 which is inwardly inclined and serves to prevent the material from falling back through the axial opening of the ramp 14.

In order to cause the material to travel upward along the ramp 14, the tube 10 is mounted upon a plurality of spring members 16 extending respectively between blocks 17 and 18, the former, 17, being fixed to a base 20 and the latter, 18, being attached to the exterior of the tube 10. As shown, there are four of these spring members 16 spaced ninety degrees apart about the periphery of the tube 10, and angularly disposed at approximately forty-five degrees to the base 20, so that the effective force of the spring members is not only to return the tube upwardly after being lowered, but also to exert a torque in the direction to throw the material clockwise along the ramp.

For pulling the tube 10 downward against the spring tension and thereby with the action of the spring members impart a vibration to the tube, an electro-magnet 21 is mounted upon the base 20 in close operative proximity to an armature 22 fixed to the bottom of the tube 10, and is energized in the present instance by a sixty cycle voltage from a suitable source of alternating current by way of a rectifier 23. This rectifier 23 serves to eliminate alternate half waves of the sixty cycle current, thus giving a strong magnetic field sixty times per second with intermediate intervals when the field is negligible. The resultant vibrating force will be very much greater that it would be without the rectifier.

From the foregoing and by reason of the angularity of the spring members 16, it will be evident that each time the tube 10 is pulled down by the magnet 21, the front of the tube 10, which is supported by the front block 18, will move to the right, while the back of the tube 10, which is supported by the back block 18, will move to the left, so that the motion of the tube 10 is simultaneously downward and counter-clockwise as viewed from the top. The restoring movement by the spring member action will be upward and clockwise. This latter motion will serve to cause the material to travel upward along the ramp 14 in a clockwise direction each time this motion occurs.

In Fig. 4 of the drawings, a modified form of the invention comprises an electro-magnet 24 and a permanent magnet 25 having common poles, which latter are arranged in juxtaposed relation to the armature 22 in place of the electro-magnet 21. In this construction, a much stronger average driving force is obtained than would be available without the permanent magnet 25.

In cases where the tube 10 is relatively long, the two vibrations, longitudinal and tangential, which are necessarily in phase at the bottom where the spring members are attached, may be substantially out of phase at the top. This will materially reduce the efficiency of the conveyor. In order to overcome this situation, one form of the invention comprises the construction shown in Figs. 5 and 6, wherein spring rods 26 are respectively connected at one end to blocks 27 fixed to the tube 10 near the top thereof, and at the other or free end to comparatively heavy weights 28. The natural frequency of vibration of these weights 28 is very much lower than the frequency of operation of the system. As the tube 10 moves downward, the weights 28 are given an impulse in a clockwise direction looking downward on the tube and in return give an impulse in a counter-clockwise direction to the tube. Thus, to a degree of approximation, these weights 28, which are entirely supported by the springs, act like rigid supports and serve to keep the longitudinal and tangential components of the vibration substantially in phase.

In the modification of Fig. 7, the top of the tube 10 is provided with a centrally disposed post 30 connected to steel wires 31, three being shown by way of example, which are respectively connected to fixed or rigid supports 32. The wires 31 are angularly disposed with respect to each other to exert substantially equal radial restraining means for the tube, and function to prevent sidewise motion in any direction.

In Fig. 8 a modification of the means for giving the tube 10 its down and angular motion is shown wherein a crank arm 33, keyed to a driven shaft 34, is attached to the bottom of the tube 10 by means of a relatively weak spring 35. As the crank arm 33 rotates, a succession of pulls of the spring will give the desired vibratory motion to the tube 10. By varying the eccentricity of the crank arm 33, and the stiffness of the spring 35, the amplitude of vibration, and therefore the rate of handling of material, can be varied at will over a very wide range.

It will now be apparent that a complete unitary conveying system for material has been devised suitable for handling almost any material in the form of small grains, larger granules, or lumps, including, for example, such things as sand, coal, ashes, salt or sugar, slate, and bone. It will also convey many natural products, such as string beans, maize or barley.

In operation, the alternate action of the electro-magnet or other means with the restoring spring action causes the tube to vibrate linearly and angularly to the axis of the tube with the result that the material is caused to flow upward along the ramp in a clockwise direction and thus travels round and round the helical ramp until discharged at the outlet 12.

In order to obtain the maximum movement of the tube and ramp with the smallest driving force, the supporting springs 16 should generally be so chosen that the natural vibration frequency of the system is approximately the same as the frequency of the driving current. Also, it should be noted that the amplitude needed will usually be quite small, that is, often of the order of a few thousandths of an inch. The upward slope of the ramp, at its inner edge may be ten or fifteen degrees when handling almost any granular material, and for many materials it may be a great deal steeper than this. The slope, however, may also have any desired lower value, and it may be downward at any angle up to the angle of repose of the material.

Having thus described my invention, I claim:

1. In a material handling device, the combination of a vertically disposed rigid helical conveyor member having an inlet and an outlet to receive and discharge material at different elevations, flexible means symmetrically arranged about the axis of the conveyor member and resiliently supporting said conveyor member for reciprocation in a confined inclined arcuate path of movement about said axis, electromagnetic motor mechanism having armature and field means, means to secure the armature means to the rigid helical conveyor member symmetrically to said axis, and means to mount the field means in operative spaced relation to said armature means, said field means being energized by electrical impulses to directly impart magnetic forces symmetrically to said armature means to reciprocate the conveyor member in said inclined arcuate path of movement to convey material from one elevation to another.

2. In a helical conveyor device, the combination of a vertically disposed rigid helical conveyor member, a plurality of spring means disposed about a common axis and mounted to support said helical conveyor member for reciprocation in a confined inclined arcuate path of movement about said axis, and driving means mounted to be effective in imparting energy impulses axially of said helical conveyor member causing it to reciprocate in its confined path of movement and in synchronism with the frequency of said energy impulses.

3. In a material handling device, the combination of a vertically disposed rigid helical conveyor member having a central axis and having an inlet and an outlet to receive and discharge material at different elevations, means to support the rigid helical conveyor member for reciprocation in a confined inclined arcuate path of movement about said central axis, an electromagnetic motor having an armature member and a field member supported in operative spaced relation with each other, and means for securing one of said members to one end of the rigid helical conveyor member, said field member being energized by electrical impulses and mounted to rapidly reciprocate one of said members relative to the other by imparting axial actuating forces which reciprocate the rigid helical conveyor member in its confined path of movement and in synchronism with the frequency of said current impulses.

4. In a conveyor, the combination of a vertically disposed rigid helical conveyor, flexible means resiliently supporting said conveyor for reciprocation in a confined inclined arcuate path of movement about a common axis, an armature secured to the conveyor, and an electromagnetic field energized by current impulses and mounted in operative spaced relation relative to said armature to have its actuating forces disposed parallel to said common axis and effective on said armature to operate the conveyor in its confined path of movement and convey material from one elevation to another.

5. In a conveyor, the combination of a vertically disposed rigid helical conveyor, flexible means resiliently supporting the conveyor for reciprocation in a confined inclined arcuate path of movement about a common axis, an armature member secured to the conveyor and having its pole face disposed normally to said common axis of the conveyor, and an electromagnetic field member energized by current impulses and mounted to be effective in imparting its actuating forces on the armature to reciprocate the conveyor in its confined path of movement and convey material from one elevation to another.

6. In a material handling device, the combination of a vertically disposed rigid helical conveyor, flexible means resiliently supporting said conveyor for reciprocation in a confined inclined arcuate path of movement about a common axis, an electromagnetic motor having an armature member and a field member supported in spaced operative relation with one another, and means for securing one of said motor members to the conveyor in alignment with said common axis, said field member being energized by electrical impulses to reciprocate the conveyor in its confined path of movement and in synchronism with the frequency of said current impulses.

LEE DEVOL.

REFERENCES CITED

The following references are of record in the file of this patent:

UNITED STATES PATENTS

| Number | Name | Date |
|---|---|---|
| 1,672,807 | Etzel | June 5, 1928 |
| 2,280,056 | Broekhuysen | Apr. 21, 1942 |
| 2,374,664 | Carrier | May 1, 1945 |

FOREIGN PATENTS

| Number | Country | Date |
|---|---|---|
| 279,119 | Great Britain | Oct. 15, 1927 |